Aug. 23, 1955  H. G. CARTOUX  2,716,145
ELECTRODE HOLDER

Filed Sept. 21, 1953  2 Sheets-Sheet 1

INVENTOR
HENRI G. CARTOUX

BY Norman S. Blodgett
ATTORNEY

Aug. 23, 1955  H. G. CARTOUX  2,716,145
ELECTRODE HOLDER

Filed Sept. 21, 1953  2 Sheets-Sheet 2

INVENTOR
HENRI G. CARTOUX

BY *Norman S. Blodgett*

ATTORNEY

United States Patent Office 2,716,145
Patented Aug. 23, 1955

2,716,145

ELECTRODE HOLDER

Henri G. Cartoux, Chedde, France, assignor to Pechiney, Paris, France, a corporation of France Application September 21, 1953, Serial No. 381,351

5 Claims. (Cl. 13—16)

This invention relates to an electrode holder and more particularly to an apparatus for supporting and supplying electrical current to an electrode for an electrical furnace or the like.

In many types of apparatus, such as electrolytic refiners and electric furnaces, the electrodes are held by means of holders having jaws which grip the body of the electrode and through which the current is introduced. In the past, however, it has not been possible to obtain this function of holding the electrode with satisfactory mechanical and electrical performance. One reason for this was that the area of contact between the holder and the electrode was not as great as could be wished. In practice the surface of the electrode almost never coincided with the surfaces of the gripping parts of the jaws of the holder. Thus, when the best known holder of the prior art is used with a cylindrical electrode, this type of holder consisting of two jaws linked to a support, there have been at most three lines of contact between the electrode and holder. This drawback becomes more apparent when the size of the electrode varies from the standard while remaining within the range of tolerance customary in the art. Another difficulty which has been experienced in the past with this type of apparatus is that the jaws become dangerously hot. Also, holders have been extremely heavy. The present invention obviates the difficulties of the prior art in a novel manner.

It is therefore an outstanding object of the present invention to provide an electrode holder which contacts the electrode over large areas for outstanding mechanical and electrical characteristics.

Another object of the invention is the provision of a holder for an electrode in which the electrode-contacting members are capable of being cooled.

A further object of the instant invention is the provision of a holder for electrodes so constructed as to permit the optimum in lightness in weight.

It is another object of the invention to provide an electrode holder having a large number of pads for contacting the surface of the electrode, these pads being capable of self-adjustment to contact the electrode over the greatest possible area.

It is a still further object of the invention to provide a pad for an electrode holder which pad is very light in weight and which is so constructed as to permit water cooling.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings.

Like reference characters denote similar parts in the several figures of the drawings.

Figure 1:
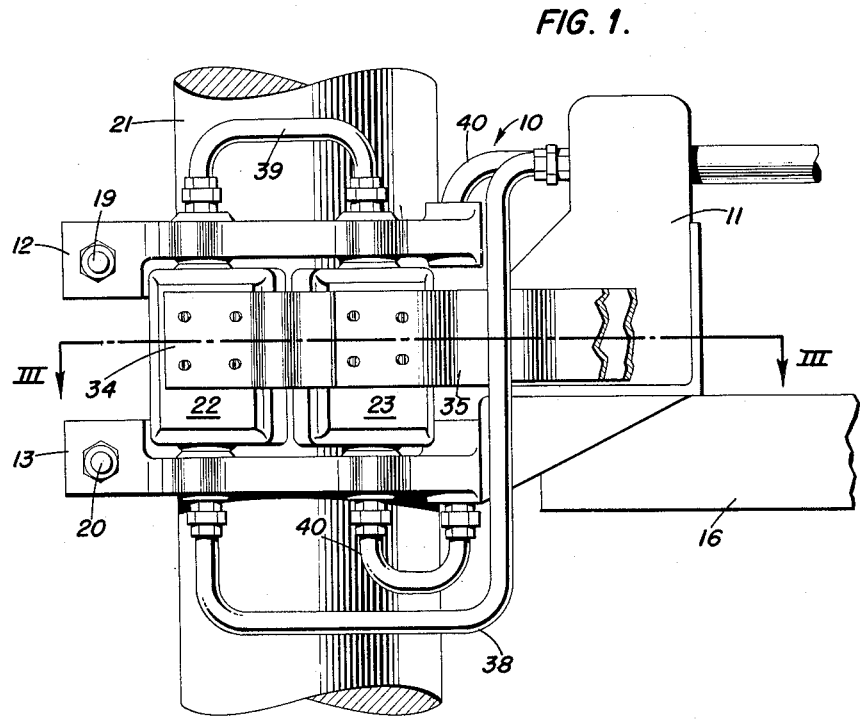
Fig. 1 is an elevation view of the electrode holder of the invention.
Figure 2:
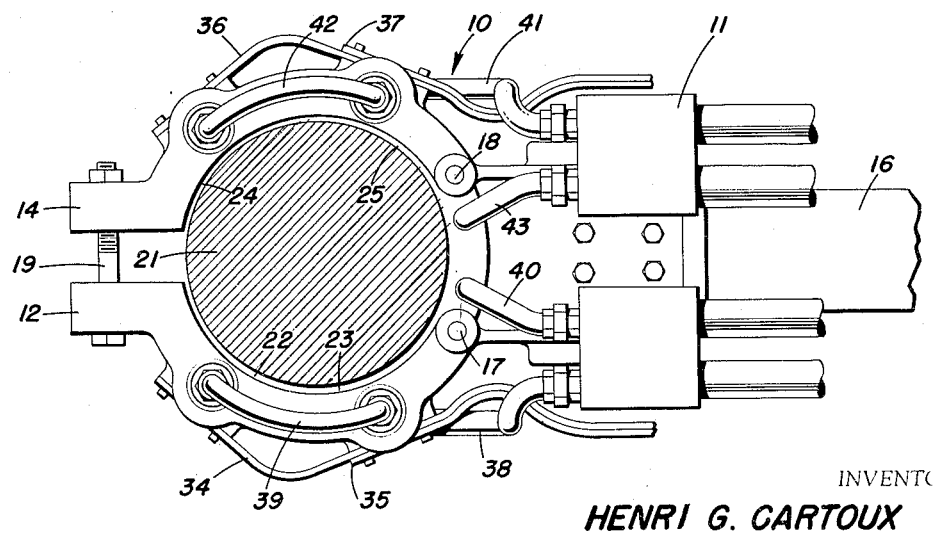
Fig. 2 is a plan view of the holder.
Figure 3:
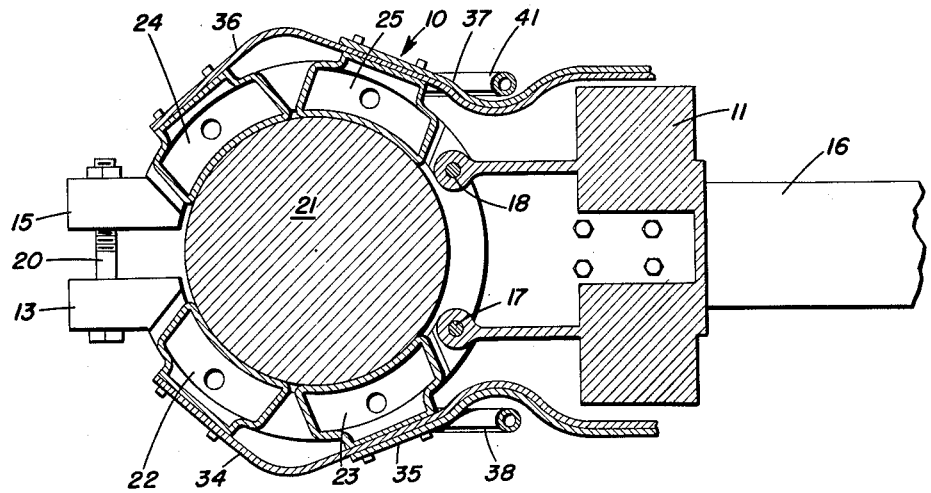
Fig. 3 is a sectional view of the holder taken on the line III—III of Fig. 1.

Referring to the drawings, the electrode holder, designated generally by the reference character 10, is shown as comprising a main body member 11 and jaws 12, 13, 14 and 15. The body member 11 is bolted or otherwise fastened to a supporting member 16 which is a fixed portion of an electrolytic cell or electric furnace, depending upon the use to which the holder and the electrode are to be used. The jaws 12 and 13 are hingedly pivoted to upper and lower portions, respectively, of the body member 11 at one side thereof and are capable of movement about a hinge pin 17 (see Fig. 3). The jaws 14 and 15 are similarly mounted on the other side of the body member 11 and are capable of hinged movement about a hinge pin 18. At their outer ends the jaws 12 and 14 are adjustably fastened by means of a bolt 19, while the jaws 13 and 15 are similarly joined by a bolt 20. The pairs of jaws may thus be drawn together to clamp an electrode 21.

Figure 4:
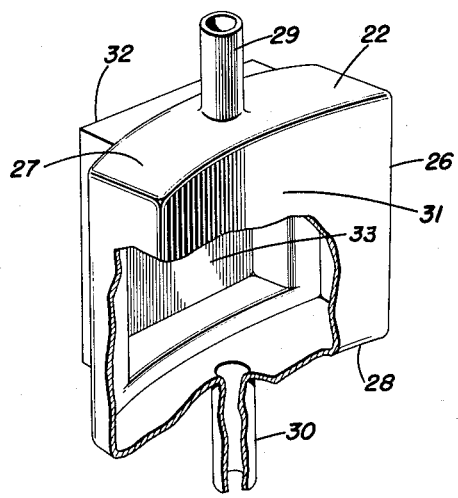
Fig. 4 is a perspective view of an element of the holder with a portion broken away to show the construction more adequately.

Between the jaws 12 and 13 are mounted two pads 22 and 23, while a similar pair of pads 24 and 25 are mounted between the jaws 14 and 15. These pads are all alike, a representative pad 22 being shown in Fig. 4. Each pad is provided with a cylindrical surface 26 terminating in more or less planar ends 27 and 28 from which extend tubular shafts 29 and 30, respectively. The surface 26 has an inner face 31 which is of generally circular cylindrical form and an outer face 32 which is planar. All corners are provided with generous rounds and the tubular shafts 29 and 30 give access to a hollow interior 33 of the pad.

Each pad is mounted between two jaws with the tubular shafts lying in aligned bores in the jaws. The shafts serve as journals for the pivotal motion of the pads about an axis determined by the axes of the shafts. In the specific embodiment, the four pads are located so as to produce uniform pressure on the electrode 21. A flexible electrical lead is fastened to the outer face 32 of each of the pads by means of screws or the like; in the present case, leads 34, 35, 36 and 37 are attached to pads 22, 23, 24 and 25 respectively.

Through an abutment of the body member 11 is passed an input conduit 38, adapted to carry cooling water. It passes downwardly to the lower tubular shaft 30 of the pad 22. A conduit 39 passes from the upper shaft 29 of the pad 22 to the upper shaft of the pad 23. A conduit 40 is connected to the lower shaft of the pad 23 and passes outwardly through an abutment of the main body member 11. In a similar manner an input conduit 41 is connected to the lower shaft of the pad 24, a conduit 42 connects the upper shaft of the pad 24 to the upper shaft of the pad 25, and a conduit 43 is connected to the lower shaft of the pad 25 and passes outwardly through an abutment of the body member 11.

The operation of the invention will now be understood in view of the above description. The electrode holder of the invention is firmly fixed by fastening the main body member to a rigid portion of the furnace apparatus, such as the supporting member 16. The electrode 21 is placed in the space between the pairs of jaws and then the bolts 19 and 20 are tightened. The electrode is contacted and clamped in place by the pads 22, 23, 24 and 25. Because of the ability of the pads to rotate about the axes determined by their shafts, each pad adjusts itself to embrace its portion of the electrode in the optimum manner and with the greatest possible contact area. Cooling water enters the conduit 38, passes through the pad 22, the conduit 39, and the pad 23, and leaves by way of the conduit 40. In the same manner, cooling water also enters the conduit 41 and passes through the pad 24, the conduit 42, and the pad 25 before leaving through the conduit 43.

It is to be noted that the flexible electrical leads permit the pads to rotate about their axes in the desired manner. The device described above has the advantage over previously known holders of providing considerably increased contact area on the electrode, while, at the same time, having the added benefits of good cooling and lightness in weight.

Other modes of applying the principle of the invention may be employed, change being made as regards the details described, provided the features stated in the following claims, or the equivalent of such be employed.

I therefore particularly point out and distinctly claim as my invention:

1. An electrode holder for use at high temperatures comprising a main body member, two jaws hingedly connected to the body member, means for drawing the jaws together to surround the electrode, pads having hollow shafts at their ends, the hollow shafts being journaled in openings provided in the jaws, conduits connected to the shafts for providing the pads with cooling fluid, and flexible electrical leads fastened to the pads on the portions thereof facing away from the electrode.

2. An electrode holder comprising a main body member, two jaws hingedly connected to the body member, means for drawing the jaws together to surround the electrode, pads having hollow shafts at their ends, the hollow shafts being journaled in openings provided in the jaws, conduits connected to the shafts for providing the pads with cooling fluid, and flexible electrical leads fastened to the pads.

3. An electrode holder for use at high temperatures comprising a main body member, two jaws hingedly connected to the body member, means for drawing the jaws together to surround the electrode, pads having an extensive cavity therein, the pads being pivotally mounted in the jaws, conduits connected to the said cavities for passing cooling fluid therein, and flexible electrical leads fastened to the pads on the portions thereof facing away from the electrode, the said conduits being connected to the pads along the axis of the pivotal mounting thereof in the jaws.

4. An electrode holder for use at high temperatures comprising pads having hollow shafts at their ends, the hollow shafts being journaled in openings provided in the jaws, means for drawing the pads together to embrace the electrode, conduits connected to the shafts for providing the pads with cooling fluid, and flexible electrical leads fastened to the pads on the portions thereof facing away from the electrode.

5. An electrode holder comprising a main body member, two jaws hingedly connected to the body member, means for drawing the jaws together to surround the electrode, hollow pads having shafts at their ends, the shafts being journaled in openings provided in the jaws, conduits connected to the shafts for providing the pads with cooling fluid, and flexible electrical leads fastened to the pads.

References Cited in the file of this patent

UNITED STATES PATENTS

| 573,041 | Schindler | Dec. 15, 1896 |
| 1,254,080 | Snyder | Jan. 22, 1918 |
| 1,284,306 | Gardner | Nov. 12, 1918 |
| 1,318,992 | Hall | Oct. 14, 1919 |
| 1,920,378 | Greene | Aug. 1, 1933 |